United States Patent
Hartvigsen et al.

(10) Patent No.: US 9,240,605 B2
(45) Date of Patent: Jan. 19, 2016

(54) PLASMA-CATALYZED, THERMALLY-INTEGRATED REFORMER FOR FUEL CELL SYSTEMS

(71) Applicant: Ceramatec, Inc., Salt Lake City, UT (US)

(72) Inventors: Joseph J Hartvigsen, Kaysville, UT (US); Elangovan, South Jordan, UT (US); Piotr Czernichowski, Layton, UT (US); Michele Hollist, South Jordan, UT (US); Michael Boettcher, Salt Lake City, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 106 days.

(21) Appl. No.: 14/242,421

(22) Filed: Apr. 1, 2014

(65) Prior Publication Data

US 2015/0044588 A1 Feb. 12, 2015

Related U.S. Application Data

(62) Division of application No. 11/745,942, filed on May 8, 2007, now Pat. No. 8,728,180.

(60) Provisional application No. 60/798,863, filed on May 8, 2006.

(51) Int. Cl.
*B01J 7/00* (2006.01)
*C01B 3/36* (2006.01)
(Continued)

(52) U.S. Cl.
CPC ............ *H01M 8/0618* (2013.01); *C01B 3/342* (2013.01); *C01B 3/384* (2013.01); *H01M 8/0643* (2013.01); *H01M 8/086* (2013.01); *H01M 8/12* (2013.01);
(Continued)

(58) Field of Classification Search
CPC ........................................................ C01B 3/00
USPC ................................................................. 48/61
See application file for complete search history.

(56) References Cited

U.S. PATENT DOCUMENTS

| 3,488,226 A | 1/1970 | Baker et al. |
| 3,622,493 A | 11/1971 | Crusco |

(Continued)

FOREIGN PATENT DOCUMENTS

| FR | 2758317 | 7/1998 |
| FR | 2768424 | 3/1999 |

(Continued)

OTHER PUBLICATIONS

U.S. Appl. 60/798,863, filed May 8, 2006, Hartvigsen et al.
(Continued)

*Primary Examiner* — Matthew Merkling
(74) *Attorney, Agent, or Firm* — David Fonda

(57) ABSTRACT

A reformer is disclosed in one embodiment of the invention as including a channel to convey a preheated plurality of reactants containing both a feedstock fuel and an oxidant. A plasma generator is provided to apply an electrical potential to the reactants sufficient to ionize one or more of the reactants. These ionized reactants are then conveyed to a reaction zone where they are chemically transformed into synthesis gas containing a mixture of hydrogen and carbon monoxide. A heat transfer mechanism is used to transfer heat from an external heat source to the reformer to provide the heat of reformation.

12 Claims, 8 Drawing Sheets

(51) Int. Cl.
| | |
|---|---|
| C01B 6/24 | (2006.01) |
| C01B 3/02 | (2006.01) |
| H01M 8/06 | (2006.01) |
| C01B 3/34 | (2006.01) |
| C01B 3/38 | (2006.01) |
| H01M 8/08 | (2006.01) |
| H01M 8/12 | (2006.01) |
| H01M 8/14 | (2006.01) |

(52) U.S. Cl.
CPC ....... *H01M 8/145* (2013.01); *C01B 2203/0233* (2013.01); *C01B 2203/0445* (2013.01); *C01B 2203/062* (2013.01); *C01B 2203/066* (2013.01); *C01B 2203/0805* (2013.01); *C01B 2203/0861* (2013.01); *C01B 2203/0866* (2013.01); *H01M 2008/1293* (2013.01); *H01M 2008/147* (2013.01); *H01M 2250/405* (2013.01); *H01M 2300/0051* (2013.01); *H01M 2300/0074* (2013.01); *Y02B 90/16* (2013.01); *Y02E 60/50* (2013.01)

(56) References Cited

U.S. PATENT DOCUMENTS

| | | | |
|---|---|---|---|
| 3,920,417 | A | 11/1975 | Fernandez |
| 4,141,694 | A | 2/1979 | Camacho |
| 5,069,987 | A | 12/1991 | Gordon |
| 5,340,664 | A | 8/1994 | Hartvigsen |
| 5,366,819 | A | 11/1994 | Hartvigsen et al. |
| 5,409,784 | A | 4/1995 | Bromberg et al. |
| 5,425,332 | A | 6/1995 | Rabinovich et al. |
| 5,595,833 | A | 1/1997 | Gardner et al. |
| 5,763,114 | A | 6/1998 | Khandkar et al. |
| 5,938,800 | A | 8/1999 | Verrill et al. |
| 5,993,761 | A | 11/1999 | Czernichowski et al. |
| 6,007,742 | A | 12/1999 | Czernichowski et al. |
| 6,153,852 | A | 11/2000 | Blutke et al. |
| 6,185,341 | B1 | 2/2001 | Ishida et al. |
| 6,245,309 | B1 | 6/2001 | Etievant et al. |
| 6,436,354 | B1 | 8/2002 | Priegnitz et al. |
| 6,606,855 | B1 | 8/2003 | Kong et al. |
| 6,924,608 | B2 | 8/2005 | Czernichowski et al. |
| 7,089,745 | B2 | 8/2006 | Roby et al. |
| 7,459,594 | B2 | 12/2008 | Czernichowski et al. |
| 7,588,746 | B1 | 9/2009 | Muradov et al. |
| 7,973,262 | B2 | 7/2011 | Matveev |
| 2003/0024806 | A1 | 2/2003 | Foret |
| 2003/0215374 | A1 | 11/2003 | Wheeldon et al. |
| 2003/0235725 | A1 | 12/2003 | Haltiner et al. |
| 2004/0216378 | A1 | 11/2004 | Smaling |
| 2005/0269978 | A1 | 12/2005 | Czernichowski et al. |
| 2006/0018823 | A1 | 1/2006 | Czernichowski et al. |
| 2006/0154189 | A1 | 7/2006 | Ramotowski |
| 2007/0186474 | A1 | 8/2007 | Rabovitser et al. |
| 2007/0254966 | A1 | 11/2007 | Eskin et al. |
| 2007/0259228 | A1 | 11/2007 | Hartvigsen et al. |
| 2009/0056222 | A1 | 3/2009 | Gutsol et al. |
| 2009/0100752 | A1 | 4/2009 | Sessa et al. |
| 2009/0119994 | A1 | 5/2009 | Johnson et al. |
| 2010/0003556 | A1 | 1/2010 | Hartvigsen et al. |
| 2010/0266908 | A1 | 10/2010 | de Graffenried, Sr. |

FOREIGN PATENT DOCUMENTS

| | | |
|---|---|---|
| FR | 2817444 | 5/2002 |
| FR | 0407054 | 6/2004 |
| FR | 2872149 | 12/2005 |
| FR | 2873306 | 1/2006 |
| WO | WO-9830524 | 7/1998 |
| WO | WO-9919456 | 4/1999 |
| WO | WO-0133056 | 5/2001 |
| WO | WO 0221624 | 3/2002 |
| WO | WO-2004033368 | 4/2004 |
| WO | WO-2004112447 | 12/2004 |
| WO | WO 2011119274 | 9/2011 |

OTHER PUBLICATIONS

Ridley, Basia "International Search Report for PCT/US06/25092", (Jan. 5, 2007),1-2.
Ridley, Basia "Written Opinion of the International Searching Authority for PCT/US06/25092", (Jan. 5, 2007),1-3.
Solola, T. "Office Action for U.S. Appl. No. 11/167,572", (Jul. 26, 2007),1-6.
Solola, T. "Office Action for U.S. Appl. No. 11/167,572 send Jan. 4, 2008", 1-7.
Copenheaver, B. "International Search Report for PCT/US07/11039 sent Feb. 6, 2008", 1-2.
Copenheaver, B. "Written Opinion for PCT/US07/11039 sent Feb. 6, 2008", 1-7.
Wisegeek (Author Unknown), "What is a Plasma Cutter?", (c) 2006, retrieved from the internet on Nov. 21, 2007. Available at http://web.archive.org/web/20060427222537/http://www.wisegeek.com/what-is-a-plasma-cutter.htm,(Apr. 27, 2006),1-2.
Czernichowski, A. "Glidarc Assisted Preparation of the Synthesis Gas from Natural and Waste Hydrocarbons Gases", *Oil & Gas Science and Technology—Rev. IFP*, vol. 56, No. 2,(2001),181-198.
Park, Hyung Dal "International Search Report", International App. No. PCT/US/2009/053207, (Apr. 1, 2010),1-3.
Park, Hyung Dal "Written Opinion of the International Searching Authority", International App. No. PCT/US/2009/053207, (Apr. 1, 2010),1-3.
Merkling, Matthew J., "Final Office Action", U.S. Appl. No. 11/745,942, (Apr. 2, 2012),1-8.
Merkling, Matthew J., "Non Final Office Action", U.S. Appl. No. 11/745,942, (Apr. 21, 2011),1-8.
Cristescu, Ioana "European Search Report", EP App. No. 07776838.0.(Corresponding to U.S. Appl. No. 11/745,942, (Dec. 14, 2011),1-7.
Gallagher, Michael et al., "Partial Oxidation and Autothermal Reforming of Heavy Hydrocarbon Fuels with Non-Equilibrium Gliding Arc Plasma for Fuel Cell Applications", Thesis submitted to Drexel University, Phil., PA, (Feb. 1, 2010),1-175.
Raju, Arun et al., "Synthesis Gas Production Using Steam Hydrogasification and Steam Reforming", *Fuel Processing Technology 90*, (2009),330-336.
Van Dyk, J. C., et al., "Syngas Production From South African Coal Sources Using Sasol—Lurgi Gasifiers", *International Journal of Coal Geology 65*, Available online Aug. 11, 2005,(2006),243-253.
Strait, Megan et al., "Synthesis Gas Reformers", http://www.owlnet.rice.edu/~ceng403/nh3ref97.html, Rice University (1997),1-6.
Czernichowski, et al., "English Language Abstract", FR 2758317, (Jul. 17, 1998),1-2.
Czernichowski, et al., "English Language Abstract", FR 2768424, (Mar. 19, 1999),1.
Czernichowski, et al., "English Language Abstract", FR 2817444, (May 31, 2002),1.
Czernichowski, et al., "English Language Abstract", FR 2872149 and FR 04007054, (Dec. 30, 2005),1.
Lewis, Stan "Search Report", *National Patent Services Search Report*, Arlington VA, (Jan. 4, 2012),1-3.
Czernichowski, et al., "English Language Abstract", FR 2873306, (Jan. 27, 2006),1-2.
Merkling, Matthew J., "Non final Office Action", U.S. Appl. No. 12/537,953, (Feb. 23, 2012),1-7.
Merkling, Matthew J., "Final Office Action", U.S. Appl. No. 12/537,953, (May 29, 2012),1-9.
Chouinard, Sebastien "Notice of Requisition", CA App. No. 2612320 (Corresponding to U.S. Appl. No. 11/167,572, (Jan. 25, 2010),1-4.
Chouinard, Sebastien "Notice of Requisition", CA App. No. 2612320 (Corresponding to U.S. Appl. No. 11/167,572, (Nov. 4, 2010),1-2.
Merkling, Matthew J., "Non Final Office Action", U.S. Appl. No. 11/745,942, (Jun. 20, 2012),1-8.

(56) References Cited

OTHER PUBLICATIONS

Merkling, Matthew J., "Final Office Action", U.S. Appl. No. 11/745,942, (Oct. 1, 2012),1-9.

Merkling, Matthew J., "Notice of Allowance", U.S. Appl. No. 12/537,953, (Jan. 14, 2013),1-8.

Merkling, Matthew J., "Notice of Allowance", U.S. Appl. No. 13/710,731, (Jan. 20, 2015),1-12.

Douyette, Kenneth J., "Non-Final Office Action", U.S. Appl. No. 13/710,733, (Jan. 16, 2015),1-17.

Cristescu, Ioana "European Examination Report", European Patent Application No. 077768380, (Dec. 9, 2014),1-6.

Cristescu, Ioana "European Examination Report", European Patent Application No. 077768380, (Oct. 25, 2012),1-7.

PLASMA-CATALYZED, THERMALLY-INTEGRATED REFORMER FOR FUEL CELL SYSTEMS

RELATED APPLICATIONS

This patent application is a divisional application of and claims priority to U.S. patent application Ser. No. 11/745,942, filed May 8, 2007, which claims priority to U.S. Provisional Patent No. 60/798,863, filed on May 8, 2006, and entitled Reformation of Liquid Logistic Fuels for Fuel Cell Systems. These applications are incorporated herein by reference.

GOVERNMENT RIGHTS

This invention was made with government support under Contract No. FA-8201-04-C-0092 awarded by the U.S. Department of Defense Air Force. The government has certain rights in the invention.

FIELD OF THE INVENTION

The present invention relates to liquid fuel reformation and more particularly to systems and methods for reforming liquid fuels for use in fuel cell systems.

BACKGROUND

As a society, we often take for granted the mobility (power and range) afforded by the energy storage density of common transportation fuels such as gasoline, aviation kerosene, and diesel fuel. The legacy investment in the refueling infrastructure alone makes it apparent that fuel cell technology capable of utilizing these existing fuels may have a distinct advantage over those restricted to high purity hydrogen or other less widely available fuels. The ability to utilize reformate produced from these existing transportation fuels, as well as from emerging non-petroleum based fuels such as bio-diesel, and synthetic (Fischer-Tropsch) liquids, without the need for extensive cleanup is an advantage of solid oxide fuel cells (SOFCs).

The higher efficiency of fuel cells compared to conventional engines is one of the main characteristics motivating the development and eventual commercialization of fuel cells. In stationary applications, utilizing natural gas fuel, this efficiency advantage is well established. However, where liquid fuels are used, a fuel processor used to reform liquid fuel exacts a heavy efficiency penalty on a fuel cell system. Historically, the sulfur and aromatic content of transportation fuels has made them impossible to reform using the catalytic steam reforming process used with natural gas systems, due to problems with "poisoning" the catalyst and carbon buildup. As an alternative, partial oxidation processes (e.g., POX, CPOX, ATR, etc.) have been employed, but these also suffer drawbacks.

Although reformed fuel or "reformate" produced by conventional partial oxidation of certain fuels typically represents about 80% of the energy content of the fuel as measured by heating value, the use of conventional partial oxidation processes with fuel cells results in a loss in the range of 30 to 40 percent of the electric power generation potential of the fuel. This is primarily due to the fact that a fuel cell is not a heat engine. Rather, a fuel cell may be considered a Faradaic engine, and the Faradaic (current producing) potential of a fuel cell is reduced by 4 Coulombs for each mole of $O_2$ introduced during the conventional partial oxidation process.

For example, referring to FIG. 1, in general, a prior art system 100 for producing electricity using a feedstock fuel 106 as an input may include a reformer 102, or fuel processor 102, and a fuel cell 104. The reformer 102 may receive and process a hydrocarbon feedstock fuel 106 to produce synthesis gas 112 containing a mixture of carbon monoxide and hydrogen gas. This synthesis gas 112 in addition to oxygen 114 may be used by the fuel cell 104 to produce electricity 116. In certain embodiments, the fuel cell 104 may generate $CO_2+H_2O$ 118 and heat 120 as a byproduct.

Where natural gas or methane is used as the feedstock fuel 106, a reformer 102 may utilize a process such as catalytic steam reforming (CSR) to produce synthesis gas 112. This process generally involves reacting the methane with steam in the presence of a metal-based catalyst to produce the desired synthesis gas 112. CSR and similar processes, however, are unable to reform liquid transportation fuels such as conventional diesel, heavy fuel oil, or jet fuel (e.g., JP-8, Jet-A, etc.). This is because the sulfur and aromatic content of transportation fuels makes them difficult or impossible to reform using CSR, at least in part because of problems with "poisoning" the catalyst and carbon buildup. Instead, partial oxidation processes (e.g., POX, CPOX, ATR, etc.) are normally employed to reform transportation fuels.

In general, a conventional partial oxidation process may include partially combusting a sub-stoichiometric mixture of feedstock fuel 106 (which may include chains of —$CH_2$— groups, or more generally $CH_n$ groups) and an oxidant 108. The combustion reaction is exothermic and provides heat 110 utilized in reforming the remaining fuel 106 to generate synthesis gas 112, the reformation reaction of which is endothermic. The heat of reformation is on the order of 30 percent of the heat generated by completely combusting the fuel 106, which can be obtained by partially combusting the fuel. Where fuels 106 are high in sulfur content, partial oxidation reactors may employ non-catalytic partial oxidation of the feed stream 106 with oxygen 108 in the presence of steam at temperatures exceeding 1200° C.

The stoichiometric reformation reaction occurring at the reformer 102 and using oxygen 108 as the oxidant may be represented generally as follows:

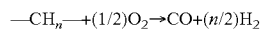

$$—CH_n—+(1/2)O_2 \rightarrow CO+(n/2)H_2$$

At the fuel cell 104, the synthesis gas 112 and oxygen 114 is converted to electricity 116, carbon dioxide 118, and steam 118 in accordance with the following equation:

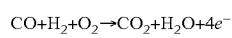

$$CO+H_2+O_2 \rightarrow CO_2+H_2O+4e^-$$

As can be observed from the above equations, each $CH_2$ group generates about $4e^-$ (4 electrons) of electricity using a conventional partial oxidation reformer.

Conventional partial oxidation techniques exact a heavy efficiency penalty on the fuel cell 104. The Faradaic (current producing) potential of a fuel cell 104 is reduced by 4 coulombs for each mole of oxygen 108 introduced in the partial oxidation process. Thus, the oxidant in convention systems reduces the ability of the fuel cell to produce electricity.

In view of the foregoing, what are needed are an improved system and method for generating reformate from various fuels that improve the Faradaic efficiency of fuel cells, such as solid oxide fuel cells (SOFCs), molten-carbonate fuel cells (MCFCs), or phosphoric acid fuel cells (PAFCs). Such a system and method would be capable of reforming fuels with high sulfur content (e.g., 10,000 ppm) without requiring sulfur pre-removal, while avoiding problems such as "poisoning" the catalyst or carbon buildup. Further needed is an improvement to the overall efficiency of fuel reformation and electricity production.

SUMMARY OF THE INVENTION

Consistent with the foregoing and in accordance with the invention as embodied and broadly described herein, a reformer is disclosed in one embodiment of the invention as including a channel to convey a preheated plurality of reactants containing both a feedstock fuel and an oxidant. A plasma generator is provided to apply an electrical potential to the reactants sufficient to ionize one or more of the reactants. These ionized reactants are then conveyed to a reaction zone where they are chemically transformed into synthesis gas containing a mixture of hydrogen and carbon monoxide. A heat transfer mechanism is used to transfer heat from an external heat source to the reformer to provide the heat of reformation. The reformation reaction may occur in the temperature range of between about 350° C. and about 1100° C.

In selected embodiments, the feedstock fuel comprises at least one of a hydrocarbon and a carbon. In other words, the feedstock fuel may include a hydrocarbon and/or a carbon fuel, which may be provided in the form of a gas, liquid, or solid. The oxidant may include at least one oxidant chosen from steam, oxygen, air, or some other oxygen-containing compound or mixture. In selected embodiments, the reactant mixture may be vaporized or gasified in order to be processed by the reformer.

In certain embodiments, the plasma generator generates a gliding electric arc to ionize the reactants. Similarly, the reaction zone may, in certain embodiments, include a reaction bed to homogenize the reactants by mixing, chemical buffering, or a combination thereof. In other embodiments, the reaction zone comprises a reaction bed containing catalysts to promote equilibration of reactive species at temperatures lower than the temperature of reformation.

In selected embodiments, the external heat source is a solid-oxide fuel cell, a molten-carbonate fuel cell, a phosphoric acid fuel cell, a Fischer-Tropsch process, or the like. In one embodiment, the reformer and fuel cell are disposed within an insulated enclosure to provide heat transfer therebetween. Heat may be transferred by way of radiation, convection, or a combination thereof.

In another aspect of the invention, a thermally integrated system for producing electricity using a feedstock fuel as an input includes a plasma reformer configured to reform a mixture containing a feedstock fuel and an oxidant. The reformate includes synthesis gas containing a mixture of hydrogen and carbon monoxide gas. The reaction producing this mixture has associated therewith a heat of reformation. A fuel cell is provided to chemically convert the synthesis gas to electricity and heat. A heat transfer mechanism is provided to transfer the heat from the fuel cell to the plasma reformer to provide the heat of reformation.

In another aspect of the invention, a method for increasing the Faradaic efficiency of a fuel cell includes preheating a mixture of reactants containing a feedstock fuel and an oxidant. An electrical potential is applied to the reactants to ionize one or more of the reactants. While providing heat of reformation, these ionized reactants are chemically transformed into synthesis gas containing a mixture of hydrogen and carbon monoxide. This synthesis gas may then be used as a fuel to generate electricity and heat. All or a portion of the heat generated may be transferred to the reactants to provide the heat of reformation.

BRIEF DESCRIPTION OF THE DRAWINGS

In order to describe the manner in which the above-recited features and advantages of the present invention are obtained, a more particular description of apparatus and methods in accordance with the invention will be rendered by reference to specific embodiments thereof, which are illustrated in the appended drawings. Understanding that these drawings depict only typical embodiments of the present invention and are not, therefore, to be considered as limiting the scope of the invention, apparatus and methods in accordance with the present invention will be described and explained with additional specificity and detail through the use of the accompanying drawings in which.

DETAILED DESCRIPTION OF THE INVENTION

Figure 1:
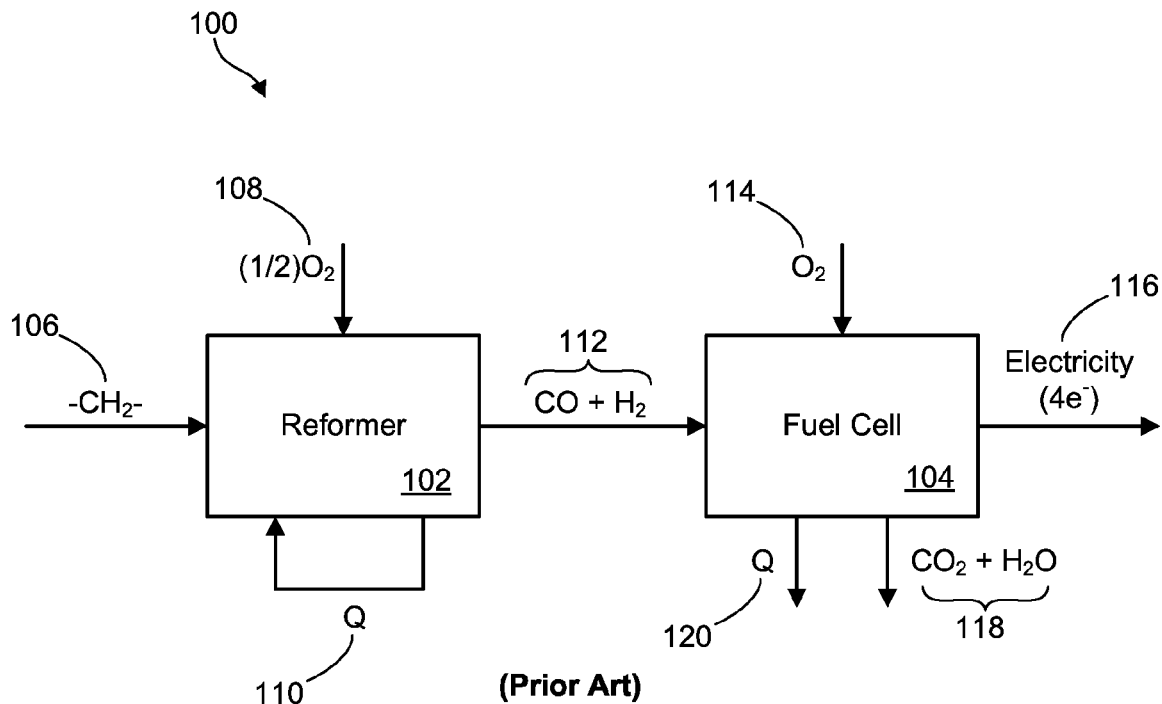
FIG. 1 is a high-level block diagram of one prior art system for generating synthesis gas for a fuel cell.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following description, numerous specific details are presented to provide a thorough understanding of embodiments of the invention. One skilled in the relevant art will recognize, however, that the invention can be practiced without one or more of the specific details, or with other methods, components, materials, and so forth. In other instances, well-known structures, materials, or operations such as vacuum sources are not shown or described in detail to avoid obscuring aspects of the invention.

Figure 2:
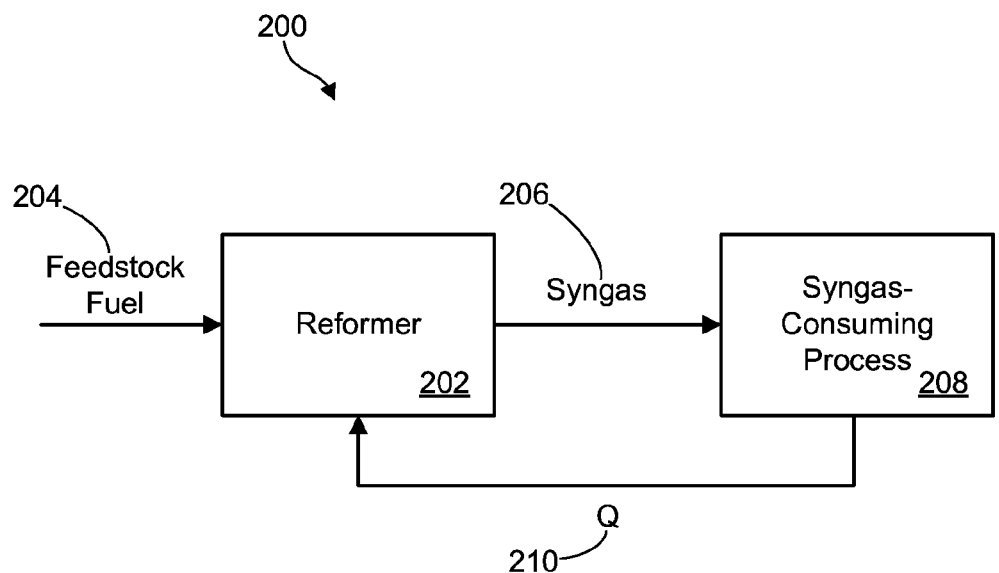
FIG. 2 is high-level block diagram of one embodiment of a system in accordance with the invention, providing improved synthesis gas production.

Referring to FIG. 2, in general, to overcome the efficiency penalty of the above-mentioned reformers, an improved system 200 in accordance with the invention may include a sulfur-tolerant reformer 202 capable of reforming feedstock fuels 204 with high sulfur content (e.g., greater than 50 ppm sulfur content) to generate synthesis gas 206. This synthesis gas 206 may be utilized by a synthesis gas consuming process 208, such as a fuel cell 104 or other device or process which consumes synthesis gas 206, which also generates heat 210 as a byproduct. At least some of the heat 210 from the consuming process 208 may be transferred to the reformer 202 where it may be used to drive the synthesis gas generating reaction, improving the yield of synthesis gas 206 from the reformer 202 and the overall efficiency of the system 200.

Figure 3:
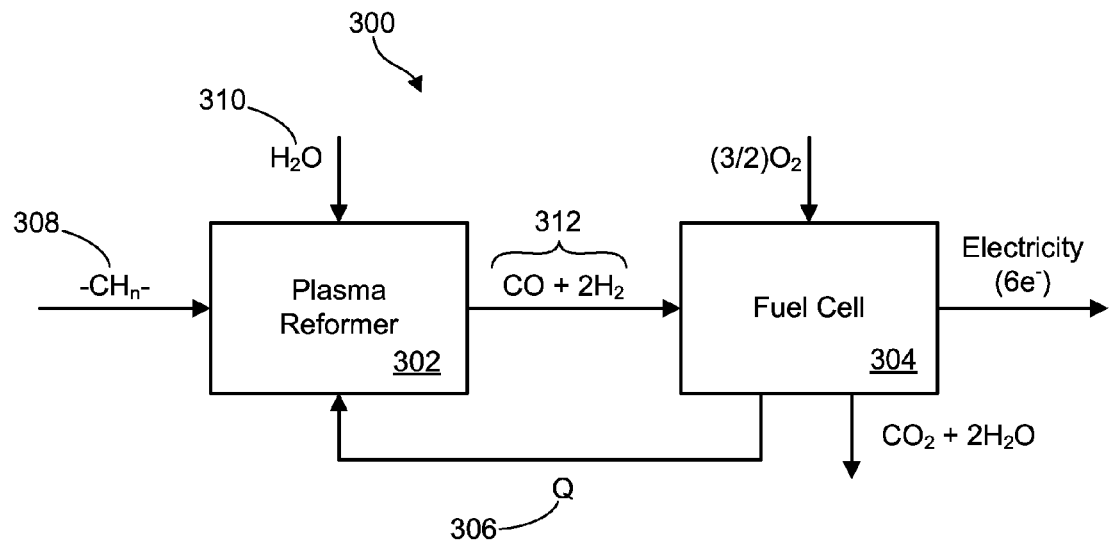
FIG. 3 is a high-level block diagram of one embodiment of a reformer in accordance with the invention, integrated with a fuel cell.

Referring to FIG. 3, one embodiment of a system 300 functioning in accordance with the system 200 described in FIG. 2 may include a plasma reformer 302 and a fuel cell 304 generating heat 306 as a byproduct. In selected embodiments, the fuel cell 304 is a solid oxide fuel cell, molten carbonate fuel cell, or other fuel cell which operates at high temperatures (e.g., greater than 600° C.). As will be explained in more detail hereafter, the plasma reformer 302 may be used to reform fuels 308 with high sulfur content without the problems associated with catalyst poisoning or carbon buildup. Thus, the plasma reformer 302 may be suitable to reform high-sulfur, liquid transportation fuels such as diesel, heavy fuel oil, or jet fuel.

Heat 306 generated by the fuel cell 304 may be transferred to the reformer 302 to provide heat of reformation to the reactants 308, 310. This may reduce or eliminate the need to combust a portion of the fuel 308 to provide heat of reformation since it is provided by the fuel cell 304. Consequently, the amount of oxygen 108 used as the oxidant (as described in FIG. 1) and used to combust the fuel 308, may be reduced or mostly eliminated and replaced with steam 310. The substitution of steam 310 makes the reaction endothermic, but produces an additional $H_2$ molecule which provides additional fuel to the fuel cell 304. As used throughout this application, "heat of reformation" includes heat utilized by the endothermic reformation reaction. "Reformation reaction" may also be referred to as the conversion of feedstock fuel and an oxidant into a synthesis gas.

To illustrate this effect, the stoichiometric reaction occurring at the reformer 302 and using steam 310 as an oxidant may be represented generally as follows:

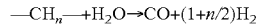

At the fuel cell 304, the synthesis gas 312 is converted to electricity, carbon dioxide, and water in accordance with the following equation:

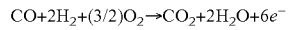

As can be observed from the above equations, each $CH_2$ group generates $6e^-$ of electricity, which constitutes a 50 percent increase over the $4e^-$ generated by the partial oxidation process described in FIG. 1.

In general, a solid oxide fuel cell converts about 50 percent of the heating value of the synthesis gas 312 to electricity and the other 50 percent to heat. Because only about 30 percent of the heating value is needed to reform the feedstock fuel 308 to synthesis gas 312, a solid oxide fuel cell produces sufficient heat 306 to provide the necessary heat of reformation to the reformer 302. Nevertheless, even where the heat 306 generated by a fuel cell 304 is insufficient to provide the required heat of reformation, the heat 306 may be supplemented by other sources (e.g., by partially combusting the feedstock fuel or using other sources of waste heat) until it is sufficient. In this way, any significant amount of heat 306 generated by the fuel cell 304 may be recycled, rather than wasted, to improve the efficiency of the reformer 302.

Figure 4:
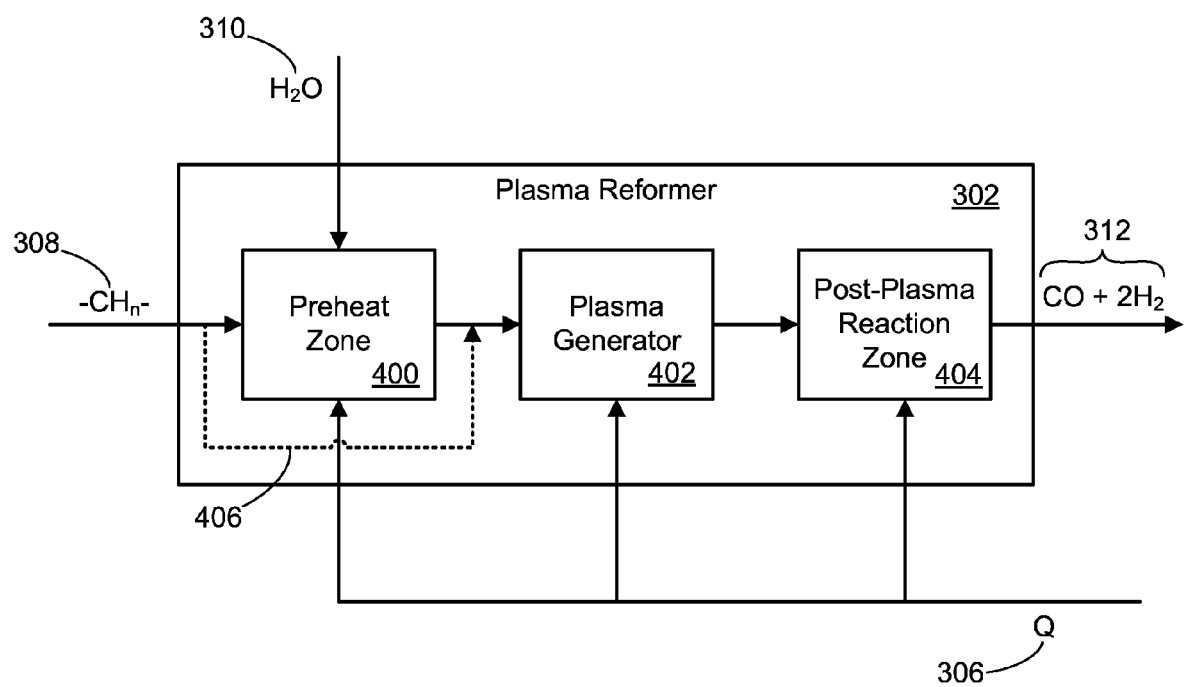
FIG. 4 is a high-level block diagram of one embodiment of a reformer in accordance with the invention.

Referring to FIG. 4, in selected embodiments, a plasma reformer 302 in accordance with the invention may include a preheat zone 400, a plasma generator 402, and a reaction zone 404. The preheat zone 400 may be used to preheat the reactants 308 to provide the required heat of reformation. Because the reformation reaction is endothermic, the reactants 308, 310 may be heated in order to generate the desired synthesis gas 312. The reactants may include feedstock fuel and an oxidant. In one embodiment, the oxidant is at least one oxidant chosen from steam, oxygen, air, or some other oxygen-containing compound or mixture. Accordingly, the oxidant may include steam or oxygen or air or oxygen-containing compounds or oxygen-containing mixtures alone or in combination with each other. Where partial oxidation is used to provide part of the heat of reformation, the oxidant 108 may be provided in sub-stoichiometric amounts to partially oxidize the feedstock fuel. It will be appreciated by those of skill in the art that when stoichiometric amounts of reactants are provided for a reaction, they are provided in a ratio such that substantially all of the reactants are consumed by the reaction. When sub-stoichiometric amounts of reactants are provided for a reaction, the reactants are not completely consumed by the reaction.

The thermodynamics of the reaction are such that synthesis gas production starts to increase at about 400° C. and maximizes at about 800° C. Thus, the reactants may be heated to a temperature at or around 800° C. to maximize synthesis gas production. The reactants 308, 310 may be preheated somewhere near this temperature when they pass through the plasma generator 402, which acts as a catalyst to initiate the reformation reaction. In selected embodiments, only the steam 310 (as well as air or oxygen mixed with the steam) is preheated. The feedstock fuel 308 may be mixed with the steam 310 just prior to passing through the plasma generator 402 (as indicated by the dotted line 406). This may prevent the feedstock fuel 308 from becoming too hot, thermally decomposing, and clogging up the system.

The preheat zone 400 may also be used to vaporize (i.e., convert to gas or mist) the reactants 308, 310 prior to routing them through the plasma generator 402. Reactants 308, 310 in a solid or liquid form may provide clusters of condensed matter which may act as nucleation sites. This may cause solid carbon nucleation which, although unavoidable, may be reduced by vaporizing the reactants 308, 310. In some cases, however, the reformer 302 may be used to process a feedstock fuel having a greater solid fraction. For example, a feedstock fuel such as a coal water slurry (i.e., coal dust entrained in water) or coal dust suspended in gas, which may have an energy content similar to jet fuel, may be vaporized as much as possible prior to being passed to the plasma generator 402. Nevertheless, feedstock fuels in pure gas form (e.g., natural gas, biogas, etc.) may be less susceptible to carbon formation.

Once preheated, the reactants 308, 310 may be passed to the plasma generator 402 to ionize or break apart one or more of the reactants 308, 310 to create reactive species. As will be explained in more detail hereafter, in selected embodiments, the plasma generator 402 may ionize the reactants 308, 310 with a gliding electrical arc. This gliding arc may provide the function of a physical catalyst by activating and initiating the reformation reaction. However, the gliding arc continually renews the active species whereas a physical catalyst relies on surface energy that can be "poisoned" by absorption of sulfur or buildup of carbon on the surface. The energy used to generate the gliding electric arc may be on the order of 2 percent of the heating value of the fuel 308 being processed. If a fuel cell 304 is 50 percent efficient (i.e., converts 50 percent of the fuel's electrical potential to electricity), then only 4 percent of the fuel cell's electricity may be used to operate the plasma generator 402. This represents an efficiency improvement over partial oxidation techniques, which may consume 30 percent or more of the fuel's current producing ability when the fuel is reformed by partial oxidation.

After ionization, the reactants may be passed to a reaction zone 404 to absorb additional heat of reformation and complete the endothermic reactions. As vaporized reactants and products of the reactants leave the plasma generator 402, some packets of gas may be oxygen rich while others may be oxygen lean. To further complete the reaction, the reactants may be physically mixed or homogenized by passing them through a chemical buffering compound, such as a solid state oxygen storage compound. Here, the storage compound may absorb oxygen from oxygen-rich packets while releasing oxygen to oxygen-lean packets. This provides both spatial and temporal mixing of the reactants to help the reaction progress toward completion.

In other embodiments, the reaction zone 404 may contain catalysts suitable for promoting equilibration of gas species at temperatures different than the reforming reaction. That is, the temperature of the synthesis gas produced in the reaction zone 404 may be reduced and other reactions may be initiated. For example, the synthesis gas may be used to produce methane within the reaction zone 404. Similarly, the synthesis gas may be "shifted" to produce more hydrogen at the expense of carbon monoxide. This may be performed, for example, by passing the synthesis gas over an iron catalyst at temperatures below 400° C. In other embodiments, the reaction zone 404 may also be used to cool reaction products leaving the reformer 302.

Figure 5A:
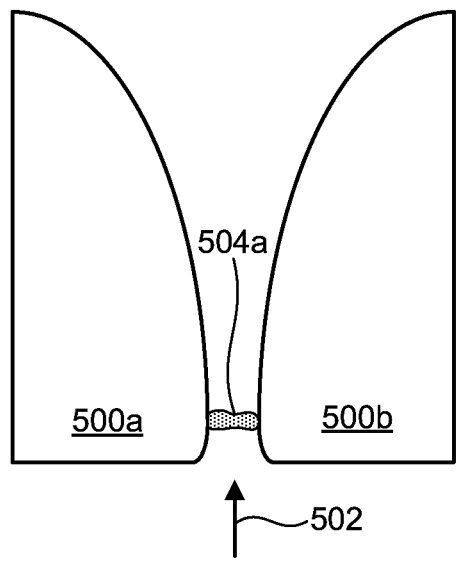
FIGS. 5A through 5C are several schematic profile views of an embodiment of a gliding arc plasma generator.
Figure 5B:
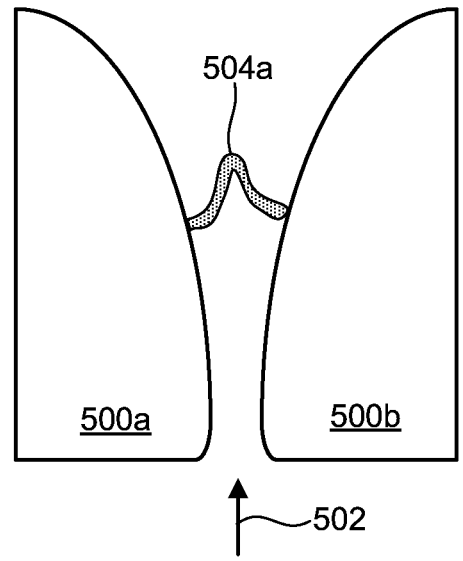
Figure 5C:
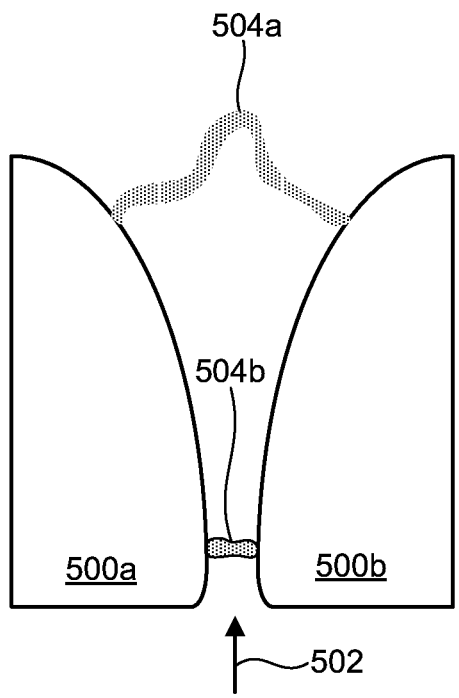

Referring to FIGS. 5A through 5C, in selected embodiments, a plasma generator 402 in accordance with the invention may include a pair of electrodes 500a, 500b having a large electrical voltage difference therebetween (e.g., 6 kV).

A preheated vapor stream containing the reactants 308, 310 may be directed between the electrodes 500a, 500b in the direction 502. The high voltage ionizes the gas which allows current to flow, creating an arc 504a, as shown in FIG. 5A. Because the ions are in an electric field having a high potential (voltage) gradient, the ions begin to accelerate toward one electrode 500a or the other 500b depending on their charge. This provides tremendous kinetic energy for initiating the reformation reaction in addition to providing means for ionizing the reactants or simply breaking the reactants into radicals to create more reactive species. Thus, in one embodiment, a plasma generator is provided to apply an electrical potential to the reactants sufficient to ionize one or more of the reactants. It will be appreciated by those of skill in that art that sufficient ionization depends upon factors including without limitation choice of electrodes, spacing of electrodes, gas flow, and pressure. A portion of the reactants is sufficiently ionized if the plasma can conduct an electrical current.

Under the influence of the flowing gas, the ionized particles are swept downstream in the direction 502, with the ionized particles forming the least resistive path for the current to flow. As a result, the arc 504a moves downstream and spreads out as it follows the contour of the electrodes 500a, 500b, as shown in FIG. 5B. Eventually, the gap becomes wide enough that the current ceases to flow. The ionized particles, however, continue to move downstream. Once the current stops flowing, the potential builds up on the electrodes 500a, 500b until it once again ionizes the gas flowing therebetween. This creates a new arc 504b at a narrower region between the electrodes 500a, 500b, as shown in FIG. 5C. This process then repeats itself. Most of the endothermic reformation reaction may actually occur in the plasma area (i.e., the area between the electrodes 500a, 500b) or immediately downstream from the plasma area.

Figure 6:
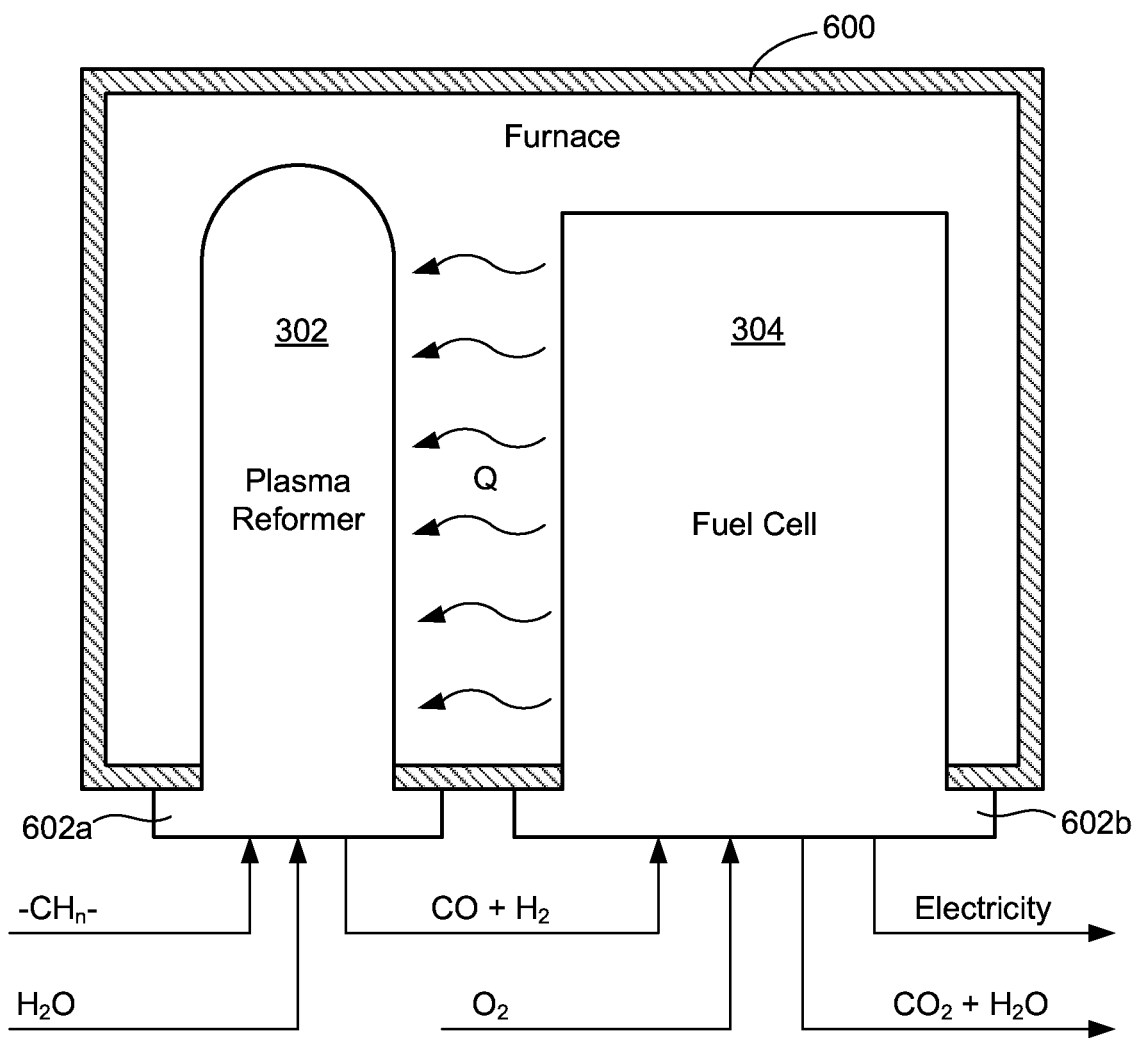
FIG. 6 is a high-level block diagram of a thermally integrated reformer and fuel cell.

Referring to FIG. 6, in order to provide heat of reformation to the reformer 302, a design may provide adequate heat transfer to the preheat zone 400, plasma generator 402, and reaction zone 404 of the reformer 302. In selected embodiments, the reformer 302 and a fuel cell 304 may be placed inside a furnace 600 or other insulated enclosure 600 in order to retain heat and effectively transfer heat between the two components 302, 304. In this embodiment, heat generated by the fuel cell 304, which may include heat generated through electrical resistance as well as heat generated electrochemically, may be transferred to the reformer 302 through radiation, convection, or a combination thereof.

Accordingly, instead of insulating the reformer 302 to retain heat, the reformer 302 may be designed to conduct heat through an exterior wall where it may be transferred to internal components and fluids. In certain embodiments, residual synthesis gas or other fuel in the exhaust of the fuel cell 304 may be burned to provide additional heat to the reformer 302. In other contemplated embodiments, heat may be transferred to the reformer 302 using a heat exchanger, such as a counter current heat exchanger. This may be used, for example, to preheat steam used by the reformer 302 with steam generated by the fuel cell 304.

In selected embodiments, the reformer 302 and fuel cell 304 may include a "cold" or reduced temperature region 602a, 602b. This enables pipes or wires to be more easily connected or disconnect to the reformer 302 or fuel cell 304 in a region of reduced temperature. Accordingly, channels for conveying the feedstock fuel, air and steam, synthesis gas, and the like, as well as wires for conducting electricity may be connected to the reformer 302 and fuel cell 304 in the reduced temperature regions 602a, 602b.

Figure 7:
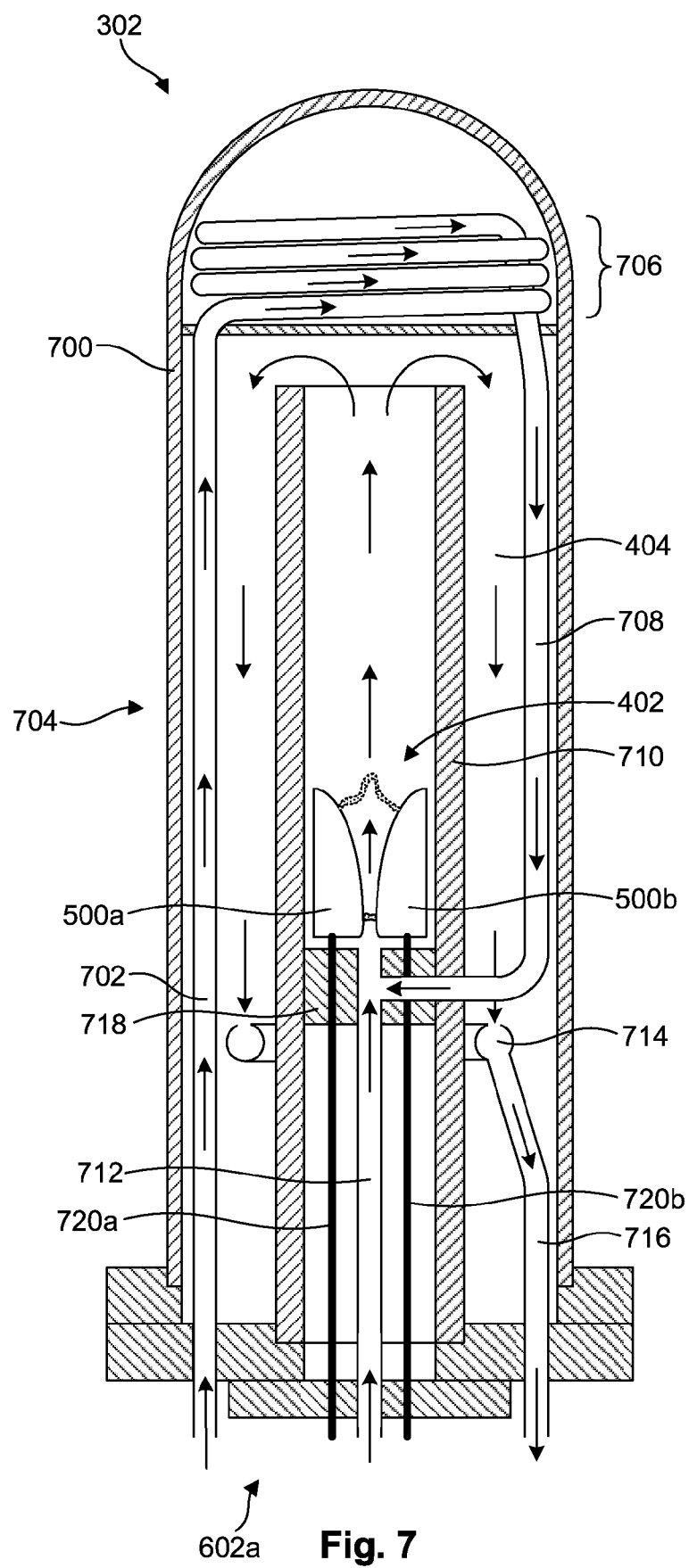
FIG. 7 is a cutaway schematic view of one embodiment of a reformer in accordance with the invention.

Referring to FIG. 7, in one embodiment, a reformer 302 provides heat transfer to the reactants by way of an outer shell 700 to absorb heat radiated or otherwise conveyed from a fuel cell 304 or other external heat source. The outer shell 700 may be made of steel or other materials having sufficient strength and stability at temperatures exceeding 800° C. In addition to providing a heat transfer mechanism to conduct heat to the reactants 308, 310, the outer shell 700 provides a gas containment envelope that keeps the reactants 308, 310 as well as the products of the reactants (e.g., synthesis gas) isolated from the external environment. It will be appreciated by those of skill in the art that a heat transfer mechanism may be anything that allows heat to transfer by radiation, convection, and/or conduction between the heat source and the reformation zone where an endothermic reaction can take place. A heat transfer mechanism may include without limitation, a surface area situated between the heat source and the endothermic reaction zone that allows heat to flow into the reaction zone. The surface area may be integral with a vessel wall. In one embodiment, the surface area that functions as a heat transfer mechanism is the surface area of the conduit that conveys reactants to the reaction zone.

A first channel 702 may be used to convey a mixture of air and steam 310 into the reformer 302. In certain embodiments, the channel 702 may originate in a low temperature region 602a of the reformer 302 and travel through a hot region 704 to preheat and further vaporize the air and steam 310. In selected embodiments, the channel 702 may be coupled to a coil 706 to provide additional surface area to further preheat the air and steam and vaporize the water 310. The coil 706 may be coupled to a channel 708 to convey the preheated air and steam 310 into an electrically insulated region, such as the inside of an electrically non-conductive tube 710. The non-conductive tube 710 may be made of a material such as an alumina ceramic and may prevent electricity from discharging from the plasma generator 402 to the conductive outer shell 700, channels 702, 708, or other conductive surfaces.

Once the air and steam 310 are preheated, it may be mixed with a feedstock fuel conveyed through a feed channel 712. In selected embodiments, this may occur within a mixing manifold 718 inside the non-conductive tube 710. Where the feedstock fuel is a liquid or solid, the air and steam 310 may be preheated sufficiently to vaporize the feedstock fuel 308 as it mixes with the air and steam 310. This preheated mixture is then introduced at some velocity between the electrodes 500a, 500b of the plasma generator 402 where it is ionized or broken into radicals to create more reactive species and thereby initiate the reformation reaction. The electrodes 500a, 500b may be connected to current-carrying conductors 720a, 720b connected to a voltage source outside of the reformer 302. In the plasma area and the area immediately thereafter, most of the reactants may be converted to synthesis gas.

In one embodiment, the reformer 302 includes a co-axial inner zone defined by an inner surface of tube 710. The inner zone may contain the plasma generator 402. The reformer also includes an outer annulus defined by the outer surface of the tube 710 and the inner surface of the outer shell 700. In this embodiment, the outer annulus contains the reaction zone 404. It will be appreciated by those of skill in the art that a number of configurations may be provided to preheat the oxidant and/or feedstock fuel. The reformer need not have coaxial or annular zones. For example, in one embodiment, a long tube without a separate annular zone may be utilized where the conduit 708 is affixed outside or within the shell 710. The coils 706 or conduit may also be positioned within the shell 700 in a zone that is collinear with the plasma generator 402.

The synthesis gas and any residual reactants may then be conveyed through the non-conductive tube 710 and into an annular reaction zone 404, where residual reactants may absorb additional heat of reformation and continue to react to form synthesis gas or other desired products. Here, the reactants may be homogenized by passing them through a pack bed of chemical buffering compounds, such as the solid state oxygen storage compound (such as for example $CeO_2$, NiO, $CeO_2$—$ZrO_2$, solids of these compounds or mixtures thereof) to promote further reaction. The pack bed may also serve to physically mix the reactants. In selected embodiments, the reactants and the products of the reactants may also be passed over catalysts suitable for promoting equilibration of gas species at temperatures different than the reforming reaction.

The resulting products of reaction (e.g., synthesis gas) and any residual reactants (e.g., hydrocarbons, steam, oxygen, etc.) as well as nitrogen from the air may be collected through a port, such as a ring-shaped collection manifold 714 or other suitable collection device disposed within the annular reaction zone 404. This fuel mixture may then be conveyed through a channel 716 where it may be transmitted to a fuel cell 304 for use as fuel. In selected embodiments, the annular region beneath the collection manifold 714 may be filled with an insulating material to maintain a temperature differential between the low temperature zone 602a and the hot zone 704.

Figure 8A:
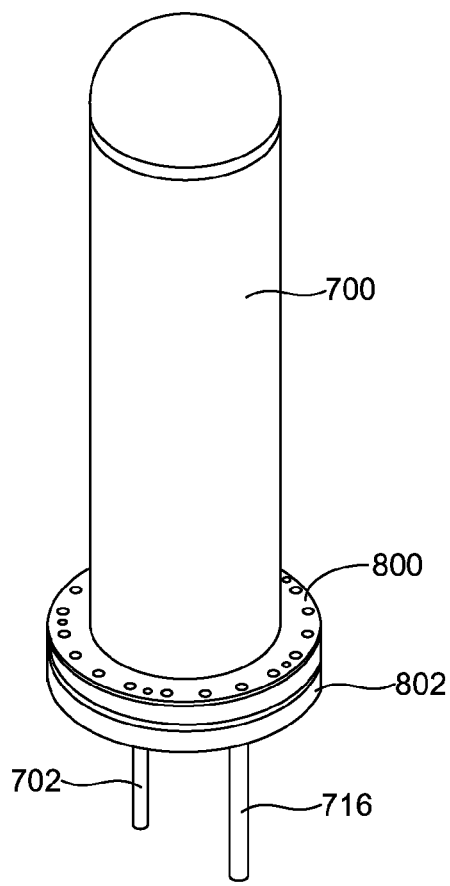
FIGS. 8A through 8C are several perspective views of various components of a reformer in accordance with the invention.
Figure 8B:
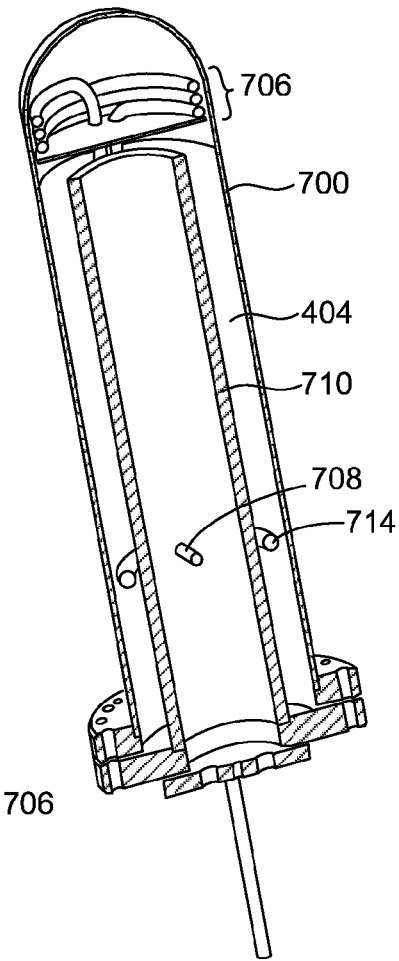
Figure 8C:
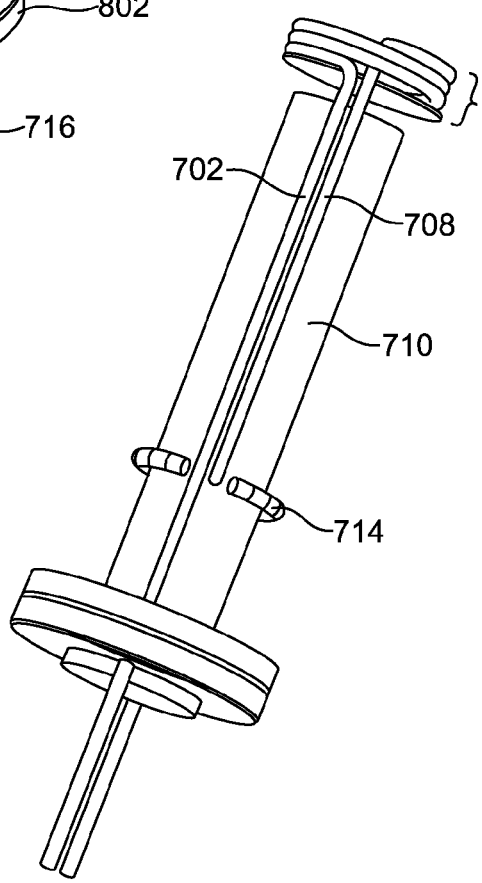

FIGS. 8A through 8C show several perspective and cutaway perspective views of one embodiment of a reformer 302 working in accordance with the principles described in association with FIG. 7. FIG. 8A shows one embodiment of an outer shell 700 having a flange 800 mountable to a furnace or other surface. A second flange 802 may be attached to many of the reformer's internal components, allowing them to be removed from the outer shell 700 without removing or detaching the outer shell 700. Channels 702, 716 may be used to convey reactants and the products of reactants to and from the reformer 302.

FIG. 8B shows a cutaway view of the outer shell 700, the inner non-conductive tube 710, and the coil 706. Also shown is a channel 708 to convey preheated air and steam through a wall of the non-conductive tube 710 into the insulated core of the tube 710. Also shown is a ring-shaped collection manifold 714 to collect synthesis gas and other residual materials from the annular reaction zone 404. FIG. 8C shows various internal components of the reformer 302 with the outer shell 700 removed, including the non-conductive tube 710, the coil 706, the channels 702, 708, and the collection manifold 714.

Figure 9A:
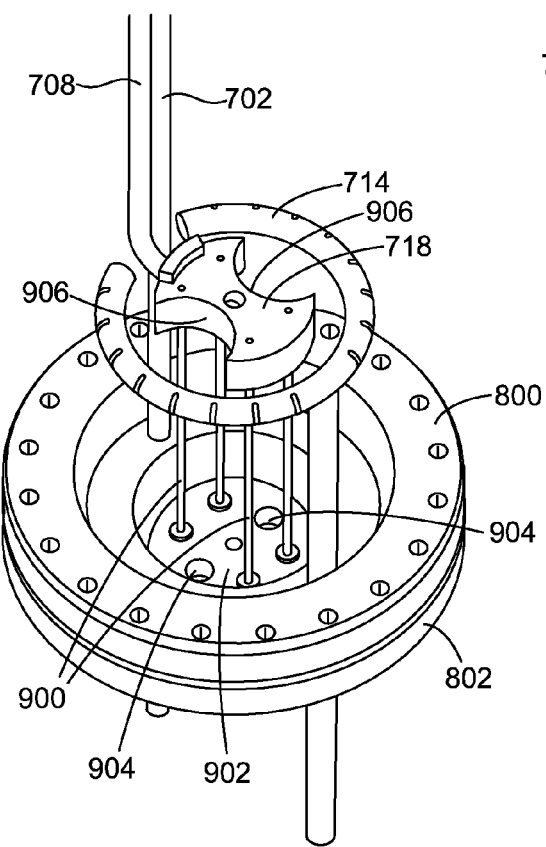
FIGS. 9A and 9B are perspective views of other components of a reformer in accordance with the invention.
Figure 9B:
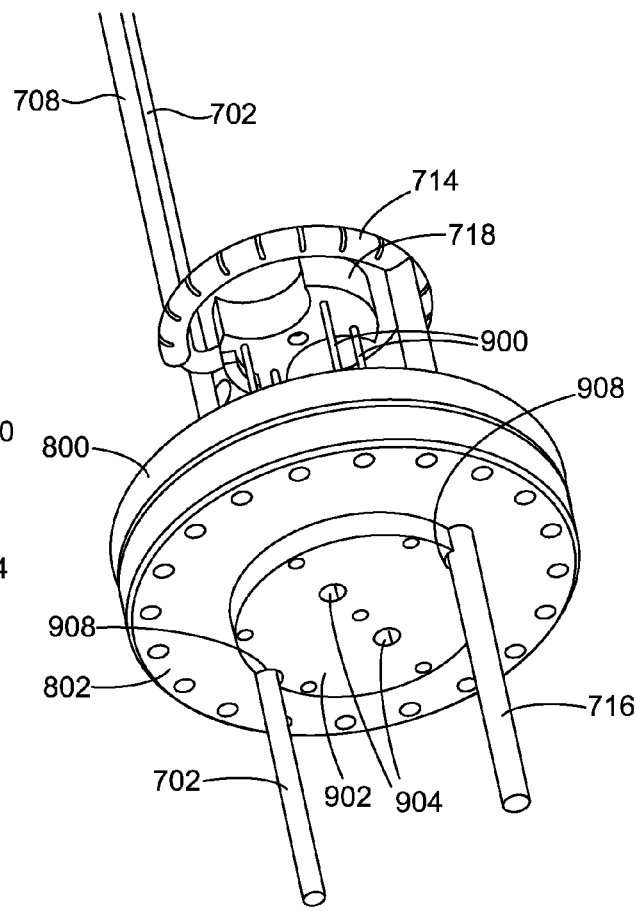

FIGS. 9A and 9B show several perspective views of embodiments of the mixing manifold 718, collection manifold 714, channels 702, 708, and flanges 800, 802, with the outer shell 700 and non-conductive tube 710 removed. As shown, in one embodiment, the mixing manifold 718 may be sustained by several support bars 900 connected to a bottom mounting plate 902. The bottom mounting plate 902 may also be provided with apertures 904 to accommodate the current-carrying conductors 720a, 720b illustrated in FIG. 7.

In addition to carrying current, the conductors 720a, 720b may act as supports for the electrodes 500a, 500b. These conductors 720a, 720b may pass through cutout regions 906 of the mixing manifold 718, without touching the manifold 718, to support the electrodes 500a, 500b at a position above the manifold 718. In the apertures 904, the conductors 720a, 720b may be surrounded by high voltage insulators which prevent electricity from discharging to the mounting plate 902, while allowing the conductors 720a, 720b to pass through the plate 902.

In selected embodiments, the mounting plate 902 may be removed from the flanges 800, 802 to remove the mixing manifold 718 and electrodes 500a, 500b from the reformer assembly 302 while leaving the rest of the reformer 302 in place. In selected embodiments, one or more notches 908 may be formed in the mounting plate 902 to ensure proper alignment, for example, of the mixing manifold 718 with the channel 708.

Figure 10:
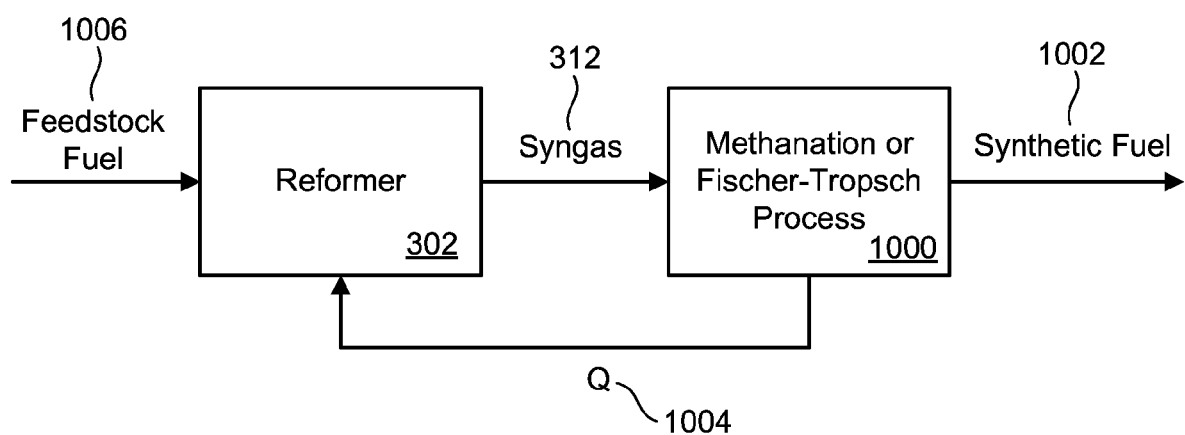
FIG. 10 is a high-level block diagram of one embodiment of a reformer integrated with a Fischer-Tropsch or methanation process and used to generate synthetic fuel.

Referring to FIG. 10, although particular reference has been made to fuel cells 104 herein, a reformer 302 in accordance with the invention may be used to improve the efficiency of other devices, systems, or processes that generate heat as a byproduct. For example, the reformer 302 may be used in conjunction with a Fischer-Tropsch or methanation process 1000 to create synthetic fuel 1002 using synthesis gas 312 as an input. As was described in association with FIG. 3, using steam as an oxidant (in place of oxygen) may produce synthesis gas with a hydrogen to carbon monoxide ratio of roughly two to one. This ratio provides a good synthesis gas input to a Fischer-Tropsch process 1000.

A Fischer-Tropsch process 1000 may include chemically reacting synthesis gas (i.e., carbon monoxide and hydrogen) in the presence of a catalyst to produce various types of liquid hydrocarbons. After extracting the liquid hydrocarbons, a tail gas may remain which may include a mixture of water vapor, carbon dioxide, methane, nitrogen, unreacted synthesis gas, as well as residual vapor hydrocarbon products. The tail gas may be recycled back to a gasification unit or to a Fischer-Tropsch reactor inlet or may be burned as fuel.

In selected embodiments, the tail gas may be burned to provide heat 1004 to a plasma reformer 302 in accordance with the invention. As previously described, this may allow steam to be used as the oxidant and may increase synthesis gas 312 production without requiring additional fuel 1006 at the reformer input. Furthermore, this provides synthesis gas with an improved hydrogen to carbon monoxide ratio (e.g., 2:1) for synthetic fuel production. Thus, a plasma reformer 302 in accordance with the invention may be used to improve synthetic fuel production when integrated with a Fischer-Tropsch process 1000.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. A thermally integrated system for producing electricity using a feedstock fuel as an input, the system comprising:
   a plasma reformer configured to convert a mixture containing a feedstock fuel and an oxidant to a synthesis gas containing a mixture of hydrogen and carbon monoxide gas, the conversion of the mixture comprising an endothermic reaction;
   a fuel cell to chemically convert the synthesis gas to electricity and heat; and
   a heat transfer mechanism to transfer heat from the fuel cell to the plasma reformer to provide the heat for the endothermic reaction.

2. The system of claim 1, wherein the feedstock fuel comprises at least one of a hydrocarbon and carbon.

3. The system of claim 1, wherein the mixture containing the feedstock fuel and the oxidant is preheated to create a vapor.

4. The system of claim 1, wherein the oxidant comprises at least one oxidant chosen from steam, oxygen, oxygen-containing compounds, and oxygen-containing mixtures.

5. The system of claim 1, wherein the feedstock fuel comprises at least one fuel chosen from a gas, a liquid and a solid.

6. The system of claim 1, wherein the conversion of the mixture containing feedstock fuel and an oxidant to a synthesis gas occurs in the range of between about 350° C. and about 1100° C.

7. The system of claim 1, wherein the conversion of the mixture containing feedstock fuel and an oxidant to a synthesis gas occurs in the range of between about 800° C. and about 950° C.

8. The system of claim 1, wherein the oxidant is provided in sub-stoichiometric amounts to partially oxidize the feedstock fuel.

9. The system of claim 1, wherein the fuel cell comprises at least one fuel cell chosen from a solid-oxide fuel cell, a molten-carbonate fuel cell, and a phosphoric acid fuel cell.

10. The system of claim 1, wherein the plasma reformer and the fuel cell are disposed within an insulated enclosure.

11. The system of claim 10, wherein the fuel cell transfers heat to the plasma reformer by way of radiation.

12. The system of claim 10, wherein the fuel cell transfers heat to the plasma reformer by way of convection.

* * * * *